United States Patent [19]

Pido

[11] Patent Number: 4,770,563
[45] Date of Patent: Sep. 13, 1988

[54] DEVICE FOR CONNECTING LINES ASSOCIATED WITH AN OFFSHORE DRILLING EQUIPMENT

[75] Inventor: Jean-Claude Pido, Le Creusot, France

[73] Assignee: Framatome, Courbevoie, France

[21] Appl. No.: 5,987

[22] Filed: Jan. 21, 1987

[30] Foreign Application Priority Data

Jan. 21, 1986 [FR] France ................................ 86 00788

[51] Int. Cl.⁴ .............................................. E21B 7/12
[52] U.S. Cl. .................................... 405/169; 166/359; 405/195
[58] Field of Search ............... 405/169, 170, 171, 195; 166/338, 350, 355, 340, 352, 341, 359, 367, 339

[56] References Cited

U.S. PATENT DOCUMENTS

| 3,313,358 | 4/1967 | Pastlewaite et al. | 166/355 X |
| 3,791,442 | 2/1974 | Watkins | 166/352 |
| 3,889,747 | 6/1975 | Regan et al. | 166/359 X |
| 4,098,333 | 7/1978 | Wells et al. | |
| 4,194,568 | 3/1980 | Burési et al. | 166/340 |
| 4,274,664 | 6/1981 | Thominet | 285/24 |
| 4,423,983 | 1/1984 | Dadiras et al. | 405/195 |
| 4,668,126 | 5/1987 | Burton | 405/169 |

FOREIGN PATENT DOCUMENTS

3826183 12/1979 Fed. Rep. of Germany .
2543611 10/1984 France .

*Primary Examiner*—Dennis L. Taylor
*Attorney, Agent, or Firm*—Pollock, Vande Sande & Priddy

[57] ABSTRACT

A device for connecting lines associated with offshore drilling equipment comprises at least one support (24, 24') hinged to the platform by tie rods (25, 25') and movable between a position of withdrawal away from the drilling column and an operating position, near the drilling column, enabling the lines (19, 20) to be connected. A jack (35, 35') enables the support (24, 24') to be moved. In the operating position, the upper sections of the lines (19, 20) carried by the telescopic joint (2) of the drilling column have their joining members (17, 18, 21) located in concordance with the joining pieces (31) of the end parts (30) of the lines connected to the platform.

6 Claims, 2 Drawing Sheets

DEVICE FOR CONNECTING LINES ASSOCIATED WITH AN OFFSHORE DRILLING EQUIPMENT

FIELD OF THE INVENTION

The invention relates to a device for connecting lines associated with offshore drilling equipment consisting of a platform, a drilling column and a set of lines intended especially for power supply to the wellhead at the base of the drilling column.

BACKGROUND OF THE INVENTION

Offshore drilling generally employs a vertical drilling column consisting of a multitude of successive tubular sections assembled end-to-end connecting the drilling platform floating on the sea surface to the wellhead anchored at the seabed. The drilling platform is therefore subjected to the various movements of the sea, whereas the wellhead is immobile. The oscillatfons of the platform and the swivelling of the drilling column relative to its vertical theoretical position are absorbed by ball joint devices placed at the base of the drilling column.

The vertical swinging motions of the platform due to swell are absorbed by the last section of the drilling column which is made in the form of a telescopic joint which can slidably move on an end tube carried by the platform and forming the other part of the telescopic assembly.

To meet the requirements of drilling, it is necessary to provide means which enable the different members of the wellhead located at the seabed to be actuated and the energy required for these members to function to be provided. It is also indispensable to carry out measurements at the wellhead and, for this purpose, to send probes or other measuring or visualization devices to the base of the drilling column.

In order to send energy to the wellhead, control signals or measuring means, lines consisting of pipes or cables capable of transporting a hydraulic fluid or energy or electrical or acoustic signals are used. These lines associated with the drilling column consist of several successive sections and a flexible end junction part connected to the platform. Each of the sections of the lines is attached to the periphery of a section of the drilling column and comprises joining means at each of its ends. During the assembly of the drilling column, the sections of this column being attached successively to one another, the sections of the lines are also automatically joined at the time of assembling the column sections. A continuity of each of the peripheral lines between the platform and the base of the drilling column is thereby ensured.

The end parts of the lines are connected, on the platform, to different points for the supply of hydraulic fluid or of electrical energy and to other actuating or measuring means which ensure the regulation of the drilling.

At the end of the drilling column assembling operations, it is essential to ensure the connection of each of the upper sections of the lines attached to the telescopic joint, at the corresponding flexible end part connected to the platform.

For this purpose, when all the sections of the drilling column have been assembled, this operation being carried out at the platform level, and then lowered through the passage opening provided in this platform, the upper end section forming the telescopic joint assembled at the upper end of the drilling column is also lowered through the passage opening in the platform, until its upper part consisting of a supporting means comes to rest on corresponding supporting means consisting of a wedging crib attached to the platform; an operator must then carry out the joining of the end parts of the lines from a place located below the wedging crib of the platform.

This manual operation requires the operator to work from a basket suspended below the platform and consists, for this operator, after catching the muff joints of the connecting parts, in introducing these male parts into the corresponding female parts of the sections carried by the telescopic joint. It is quite obvious that this operation is complex, dangerous and cannot always be carried out under conditions which ensure that the connections are achieved satisfactorily.

SUMMARY OF THE INVENTION

The object of the invention is to provide a device for connecting lines associated with offshore drilling equipment comprising a platform, a vertical drilling column consisting of a multitude of sections assembled end-to-end, the upper end section forming a telescopic joint slidably movable on a tube fixed firmly to the platform and comprising supporting means intended to come to rest on corresponding supporting means carried by the platform, through which passes the drilling column, and a set of lines each consisting of a pipe or a cable formed by several successive sections and a flexible joining end part attached to the platform and equipped with a joining piece, the sections of each of the lines each being attached to a section of the drilling column and comprising joining means at each of their ends, the connecting device being used for joining the joining end parts of the lines attached to the platform, to the corresponding upper end sections attached to the telescopic joint at the end of the assembly of the drilling column in a fully automatic manner, in a single, highly safe and highly reliable operation.

To this end, the device comprises: at least one support connected to the platform carrying the joining end parts of the lines and their joining pieces, mounted movably between a position of withdrawal away from the drilling column and an operating position enabling the connection to be made, near the drilling column, the telescopic joint of the drilling column carrying the upper sections of the lines so that their joining means are in concordance with the joining pieces of the end parts of the lines, when the support is in its operating position for the connection to be carried out, near the drilling column.

The invention also relates to a connecting device consisting of means for the orientation of the support around a substantially vertical axis.

A preferred embodiment of the device according to the invention also comprises locking means to prevent the lines from becoming disconnected, in the case where the weight of the drilling column is insufficient to ensure this locking on its own.

BRIEF DESCRIPTION OF THE DRAWINGS

In order that the invention may be more clearly understood, one embodiment of a connecting device according to the invention will now be described, by way of example, with reference to the accompanying drawings, wherein.

DETAILED DESCRIPTION

Figure 1:
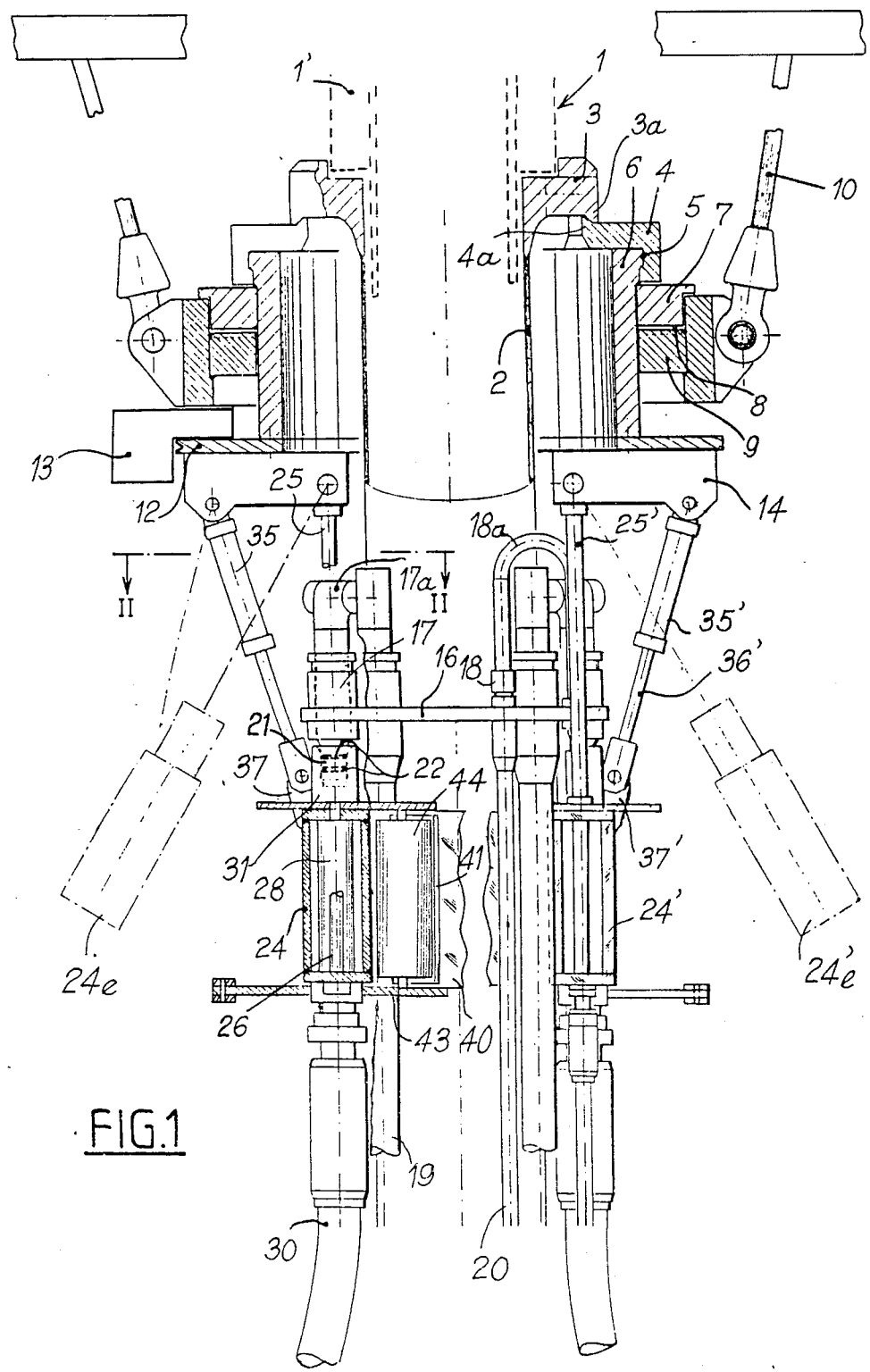
FIG. 1 is a front view, partly in section, of the upper part of the drilling column, at the level of the telescopic joint, and of the lower part of the platform.

FIG. 1 shows the upper part of the drilling column consisting of the telescopic unit 1 comprising a tubular part 1' suspended from the main body of the drilling platform and the actual telescopic joint 2 forming the external tube of the telescopic unit 1. The sliding of the telescopic joint 2 over the tubular part 1' which is fixed firmly to the platform enables the relative vertical displacement motions between the platform and the drilling column to be absorbed.

The telescopic joint 2 comprises an end reinforcing piece 3 soldered to the upper end of the tube forming the telescopic joint 2. This reinforcing piece 3 forms the means for supporting the upper section of the drilling column consisting of the telescopic joint 2 on the platform.

FIG. 1 shows the telescopic tube 2 in its low position, at the end of the assembly of the drilling column, this joint coming to rest by its reinforcing piece 3, on supporting means carried by the platform.

These supporting means consist of gripping jaws 4 forming several radially moving circular sectors, a cylindrical supporting piece 6, a supporting ring 7 and a wedging crib 9 which is itself supported by a suspension cable unit 10.

In FIG. 1, the telescopic joint 2 is shown resting against the corresponding supporting means of the platform. In this position, the conical outer lower edge 3a of the reinforcing piece 3 comes into contact with the upper edge 4a, which is also conical, of each of the gripping jaws 4, thereby ensuring the centering and the positioning of the telescopic joint 2 forming the upper part of the drilling column.

The gripping jaws 4 are shown in their tightened position, projecting towards the axis of the drilling column. In this position, their internal surface comes into contact with a shoulder 5 of the cylindrical supporting piece 6, which ensures their retention in the axial direction.

Between the supporting ring 7 and the wedging crib 9, a layer of hydraulic fluid 8 forming a fluid bearing is interposed.

The upper part (not shown), of each of the cables 10 is connected to a hydraulic jack carried by the platform and enabling suspension of the supporting means of the platform shown in FIG. 1 and an upward pull to be exerted on the drilling column by means of the telescopic joint 2, so as to maintain the drilling column in stretched condition in order to prevent any buckling under the influence of its weight.

An annular gear 12 for direction adjustment which engages with the output gear of a geared motor unit 13 attached firmly to the wedging crib 9 is attached to the lower part of the supporting cylindrical piece 6 with screws. A shell 14 is rigidly attached to the lower surface of year 12.

An annular plate 16 is soldered to the outer surface of the tubular telescopic joint 2 and serves as the support for the joining means 17, 18 of the upper sections 19, 20 of the lines attached to the telescopic joint 2. The joining means 17 and 18 which are screwed to the plate 16 comprise a rigid crosshead 17a or 18a respectively enabling the joining piece of the joining means to be directed downwards.

FIG. 1 shows that the joining piece 21 of the joining means 17 of the line 19 consists of a substantially cylindrical piece with vertical axis chamfered at its end and consisting of two recesses in which joints 22 are arranged. This muff joint is covered with a hard chromium coat enabling its wear to be restricted.

It is quite obvious that the joining pieces of other lines, and in particular the joining piece 18, are produced in a similar way.

Lines such as 19 and 20 consist of successive sections each connected to a section of the drilling column, the upper sections of these lines, shown in FIG. 1, being connected to the upper section of the drilling column consisting of the telescopic joint 2.

Figure 2:
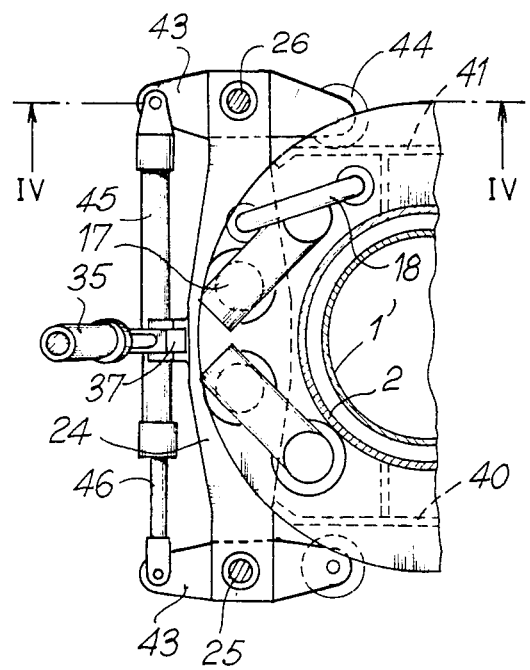
FIG. 2 is a sectional half-view along line II—II of FIG. 1, showing the support of the connections in its unlocked position.

Referring to FIGS. 1 and 2 at the same time, it is seen that two horizontal girders 24 and 24' arranged on either side of the drilling column are hinged by means of tie rods 25 and 26 (or 25' and 26', the tie rod 26' not being shown), to the shell 14 attached firmly to the direction adjustment gear 12 and the supporting cylinder 6.

The girders 24 and 24' with rectangular cross-section serve as support for the joining pieces 28 of the flexible end parts 30 of lines such as 19. The flexible end part 30 of line 19 consisting of a high pressure pipe is connected, on the platform, to a source of hydraulic fluid under pressure (not shown). Similarly, line 20, which consists of an electric cable, comprises a flexible end part which is connected to a source of electric current on the drilling platform.

The joining pieces, such as 28, of the flexible end parts of lines are in the form of a female connecting sleeve 31, with vertical axis, of a shape and a size corresponding to the cylindrical joining piece 21 of the upper section of line 19. The sleeve thus forms a tubular sleeve for the cylindrical muff joint of the joining means 17.

The suspension tie rods 25 and 25' of girders 24 and 24' respectively are mounted articulated at their upper part on the cover 14 and jacks 35 and 35' are mounted in an articulated manner, by means of their rod 36 (or 36') and by means of their body, on a cover 37 (or 37') fixed firmly to the girder 24 (or 24') and on the cover 14 respectively.

The jacks 35 and 35' enable the girders 24 and 24' respectively to be moved, between their position, shown in solid lines in FIG. 1, corresponding to the connecting position, and an out-of-action position away from the drilling column, shown in dot-and-dash lines in FIG. 1 (straddled position 24e and 24'e respectively).

Referring to the entire set of drawings, the locking device which enables the lines to be held in the connected position regardless of the load applied on these lines through the drilling column will now be described.

A guiding structure 40 consisting of sheet metal plates is soldered to the outer surface of the tubular telescopic joint 2, in a position such that this guiding structure 40 is at the level of the girders 24 and 24' when the telescopic tube 2 is in its position resting against the supporting means of the platform as shown in FIG. 1.

This supporting structure 40 has four ports such as 41 on its lateral faces.

The part of the locking device connected to the girder 24 will now be described, but it will be understood that a similar locking device is assocated with the girder 24', for locking the lines carried by the latter.

At each of the ends of the girder 24, a locking lever 43, carrying at its end pointing towards the drilling column a tubular part 44 forming a locking stop, the size of which corresponds to the size of the port 41 provided in the guiding structure 40, is mounted for free rotation about a vertical axis merged with the axis of the corresponding suspension tie rod 25 (or 26).

A jack 45 is placed between the two levers 43 associated with the girder 24 and arranged at each of the ends of this girder. The rod 46 of the jack 45 is connected in an articulated manner to one of the levers 43, while the body of the jack 45 is connected to the other lever.

Figure 4:
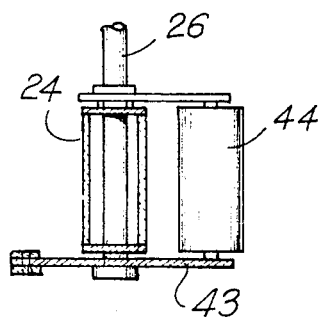
FIG. 4 is a sectional view along line IV—IV of FIG. 2.

FIG. 4 shows that the lever 43 consists of two parts connected to each other by the tubular stop 44. The jack 45 is articulated to the lower part of the lever 43 in two parts.

Figure 3:
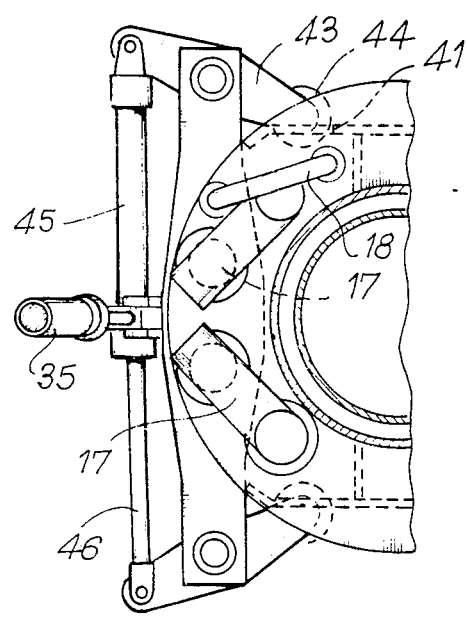
FIG. 3 is a sectional half-view similar to FIG. 2 showing the support of the connections in its position locked on the drilling column.

As can be seen in FIGS. 2 and 3, in the retracted position of the jack 45 (FIG. 2), the levers 43 are held spaced apart from each other so as to leave between their end stops 44 a transverse space sufficient to allow the passage of the guiding structure 40 with a slight play.

In contrast, in the extended position of the rod 46 from the jack 45, as shown in FIG. 3, the stops 44 attached to the ends of the levers 43 are closer to each other so as to enter into the ports 41 in the lateral faces of the guiding structure 40. This introduction of the stops into the ports 41 makes it possible to immobilize the structure 40 and the tubular telescopic joint 2 attached to it, relative to the girder 24 (or relative to the girder 24' as regards the second locking device). The locking of the connections of the lines of which one part is attached firmly to the telescopic joint 2 and the other part to the girder 24 is thereby achieved.

The device according to the invention is employed at the end of the assembly of the drilling column, the successive sections of this column being assembled at the platform level. When two successive sections have been assembled by a mechanical joint, the whole of the drilling column is lowered through the passage opening in the platform so as to offer the end of the upper end section in the assembly position. A succeeding section is brought into the assembly position, assembly is carried out and the drilling column is once again moved downwards by a length corresponding to the length of a section.

When the upper end of the drilling column is in position at the platform level, the upper end section of the drilling column consisting of the tubular joint 2 is assembled to this upper end. The gripping jaws 4 of the supporting device are in the straddled position in which their inner edge is aligned with the inner edge of the tubular supporting piece 6. The passage hole of the drilling column then corresponds to the inner diameter of the supporting tubular piece 6, which makes it possible to lower the tubular joint 2 in this opening until the plate 16 carrying the joining means 17 has completely passed through this opening of the piece 6.

During this first phase of positioning, the connections of lines, the girders 24 and 24' are in their straddled positions 24e and 24'e in which they free completely the space located in the extensoon of the opening in the platform. The descending motion of the telescopic tubular joint 2 is stopped when the male parts 21 of the joining means 17 are at a short distance above the bushes 31 which form the joining sleeves for the connections. The reinforcing piece 3 of the tubular joint 2 is then placed at a short distance above the gripping jaws 4 which are in their straddled position. The whole of the drilling column fixed firmly to the tubular joint 2 is then hinged to a hoisting means.

At the end of this first phase, the jacks 35 and 35' are actuated to bring the girders 24 and 24' from their position 24e and 24'e to their positions 24 and 24', shown in FIG. 1.

At the end of these movements, the sleeves 31 are approximately perpendicular to the corresponding muff joints 21.

The direction of the girders 24 and 24' is then adjusted so as to bring the corresponding joining pieces into perfectly vertical alignment relative to each other; for this purpose, the annular gear 12 is rotated in either direction using the geared motor 13, checking visually the position of the joining pieces 31 relative to the corresponding joining pieces 21.

The gripping jaws 4 are then moved inwards so that they come to occupy the position shown in FIG. 1 where their inner surface rests against the shoulder 5 of the supporting cylindrical piece 6.

The telescopic joint 2 and the drilling column are then lowered, until this telescocic joint comes to rest on the gripping jaws 4 in the tightened position. The gripping jaws 4 ensure the support and centering of the joint 2 and of the drilling column.

During the lowering of the telescopic joint 2 carried out using a hoisting means, the male joining pieces 21 of the lines associated with the drilling column come to engage into the sleeves 31.

It should be noted that the sleeves 31 of the larger diameter lines (lines 19) have their end edge ensuring the positioning alongside of the muff joints at a level above that of the sleeves of the smaller diameter lines such as line 20. In a first step, the positioning alongside of larger diameter lines, the assembly tolerances of which are greater, is thereby achieved. This first assembly makes it possible to carry out a guiding for the engaging of the lines of small diameter, the assembly tolerances of which are low.

During the second phase of the process, when the girders 24 and 24' are moved to bring them near the drilling column, the levers 43 and their end stops 44 cooperate with the outer faces of the guiding structure 40 so as to facilitate the positioning of the sleeves of the end parts of the lines relative to the muff joints attached firmly to the telescopic joint, as can be seen in FIG. 2.

As soon as the joining is carried out, with the telescopic joint 2 resting on the supporting means of the platform, the jack 45 is actuated to engage the stops 44 into the ports 41 of the guiding structure 40, as shown in FIG. 3. As mentioned above, locking of the connections of the lines associated with the girder 24 is then carried out. Actuation of the corresponding device associated with the girder 24' enables the other lines to be locked.

This locking of the connections is especially desirable when the drilling column is short and therefore of limited weight, so that it exerts a relatively low supporting pressure on the connections.

The device according to the invention enables the connection of lines associated with a drilling column to be carried out, in a fully automatic manner, from the platform, which increases considerably the reliability and the safety of this difficult operation.

Additionally, the locking device associated with the connecting means according to the invention enables any disengagement of the connections during operation to be avoided, irrespective of the height of the drilling column and the conditions offshore.

It is possible to provide supporting devices for the connections of the end parts of the different lines of horizontal girders connected to the platform which can swivel relative to the latter around a horizontal axis.

Other means to control the movements of these supports and other means for achieving an accurate positioning thereof can also be provided.

The locking of the connections may be carried out by means other than those described.

Finally, the process and the device according to the invention can be applied to all offshore drilling equipment consisting of a platform and a vertical drilling column comprising peripheral lines joining the platform to the wellhead arranged at the seabed.

What is claimed is:

1. Device for connecting lines associated with an offshore drilling equipment consisting of a platform, a vertical drilling column consisting of a multitude of sections assembled end-to-end, an upper end section of said drilling column forming a telescopic joint (2) movable by sliding on a tube (1') attached firmly to the platform and comprising supporting means (3) adapted to abut against corresponding supporting means (4,6, 7, 8, 9) carried by the platform, through which the drilling column passes, and a set of lines (19, 20) each consisting of a pipe or a cable formed by several successive sections and a flexible joining end part (30) having a first end attached to the platform and connected to a power source and a second end provided with a joining piece (31), the sections of each of the lines (19, 20) each being attached to a section of the drilling column and comprising joining means at each of their ends, the connecting device being used for joining the joining end parts (30) of the lines attached to the platform to the corresponding upper end sections attached to the telescopic joint (2) at the end of assembling the drilling column, wherein the connecting device consists of at least one support (24, 24') connected to the platform carrying the said second ends of the joining end parts (30) of the lines and their joining pieces (31) mounted movably between a position of withdrawal away from the drilling column and an operating position which enables the connection to be made, near the drilling column, by means of at least two tie rods (25, 26) by which it is hinged to the platform and to a hydraulic jack (35), the telescopic joint (2) of the drilling column carrying the upper sections of the lines (19, 20) so that their joining means (17, 18, 21) are in concordance with the joining pieces (31) of the flexible joining end parts (30) of the lines, when the support (24, 24') is in its operating position for the connection to be made, near the drilling column.

2. Connecting device as claimed in claim 1, wherein the support (24, 24') is a substantially horizontal girder mounted swiveling around a horizontal axis on the platform.

3. Connecting device as claimed in claim 1, wherein the support (24, 24') is connected to a part (6, 12, 14) of the platform mounted movably for rotation around the vertical axis of the drilling column by means of a bearing (8) and attached firmly to an annular gear (12) engaging with the output gear of a geared motor (13) attached to the platform.

4. Connecting device as claimed in claim 2, wherein two substantially horizontal levers (43) are articulated about substantially vertical axes, to the ends of the girder (24, 24'), by their central part, these levers (43) comprising a stop (44) at one of their ends and being articulated at their other ends to the rod or the body of a jack (45) joining the two levers (43) and enabling them to be actuated jointly in order to move the stops (44) closer to or away from the drilling column, the drilling column comprising ports (41) allowing the engagement of the stops (44), for locking the girder (24, 24') relative to the drilling column.

5. Connecting device as claimed in claim 4, wherein the telescopic joint (2) of the drilling column is attached firmly to a guiding structure (40) in which the openings (41) are provided and which carries out the guiding of the girder (24) relative to the drilling column by the co-operation of the stops (44) and the outer faces of the guiding structure (40), during the movement of the girder (24, 24') between its position away from the drilling column and its position closer to the drilling column.

6. Connecting device as claimed in claim 1, wherein the upper end of the joining pieces (31) of the end parts (30) of the lines with large diameter is located at a level above the end of the end pieces (31) of the lines with small diameter, so that the positioning alongside of the joining means (21) with the joining pieces (31) is first carried out for the ines with large diameter.

* * * * *